(12) United States Patent
Petterson et al.

(10) Patent No.: US 7,120,320 B2
(45) Date of Patent: Oct. 10, 2006

(54) METHOD AND APPARATUS FOR DISPLAYING A HANDWRITTEN MESSAGE BASED ON POSITION AND TIME DATA

(75) Inventors: Lars Petterson, Uppsala (SE); Magnus Hollström, Lund (SE); Thomas Craven-Bartle, Lund (SE)

(73) Assignee: Anoto AB, Lund (SE)

( * ) Notice: Subject to any disclaimer, the term of this patent is extended or adjusted under 35 U.S.C. 154(b) by 731 days.

(21) Appl. No.: 10/251,804

(22) Filed: Sep. 23, 2002

(65) Prior Publication Data

US 2003/0072490 A1   Apr. 17, 2003

Related U.S. Application Data

(60) Provisional application No. 60/325,122, filed on Sep. 27, 2001.

(30) Foreign Application Priority Data

Sep. 21, 2001   (SE) ................................ 0103179

(51) Int. Cl.
*G06K 9/22* (2006.01)
(52) U.S. Cl. ................ 382/314; 382/186; 345/179
(58) Field of Classification Search ............... 382/186, 382/314
See application file for complete search history.

(56) References Cited

U.S. PATENT DOCUMENTS

| | | | |
|---|---|---|---|
| 5,592,608 A | 1/1997 | Weber et al. | |
| 5,687,254 A | 11/1997 | Poon et al. | |
| 6,279,014 B1 * | 8/2001 | Schilit et al. | 715/512 |
| 6,393,138 B1 * | 5/2002 | Chai | 382/119 |
| 6,502,114 B1 * | 12/2002 | Forcier | 715/541 |
| 6,611,358 B1 * | 8/2003 | Narayanaswamy | 358/442 |
| 2002/0056085 A1 * | 5/2002 | Fahraeus | 725/1 |
| 2005/0093845 A1 * | 5/2005 | Brooks et al. | 345/179 |
| 2005/0225541 A1 * | 10/2005 | Lapstun et al. | 345/179 |

FOREIGN PATENT DOCUMENTS

| | | |
|---|---|---|
| EP | 0 764 908 A1 | 3/1997 |
| WO | WO 00/73983 A1 | 12/2000 |
| WO | WO 01/16691 A1 | 3/2001 |
| WO | WO 01/26032 A1 | 4/2001 |
| WO | WO 01/71651 A1 | 9/2001 |

* cited by examiner

*Primary Examiner*—Joseph Mancuso
*Assistant Examiner*—Kuhn Jordan
(74) *Attorney, Agent, or Firm*—Birch, Stewart, Kolasch & Birch, LLP

(57) ABSTRACT

A method and an arrangement for presentation of a graphical representation of a handwritten message on a graphical screen. Position data and time data are recorded, indicating positions and points of time for the handwritten message. An image area in the graphical representation of the handwritten message is identified based on said position data and said time data, the size of the image area being a subportion of the graphical representation of the handwritten message. Finally, display data is provided to a screen, which display data comprises a graphical representation of the subportion of the handwritten message in the identified image area.

21 Claims, 3 Drawing Sheets

METHOD AND APPARATUS FOR DISPLAYING A HANDWRITTEN MESSAGE BASED ON POSITION AND TIME DATA

This application claims priority on provisional Application No. 60/325,122 filed on Sep. 27, 2001, the entire contents of which are hereby incorporated by reference.

FIELD OF THE INVENTION

The present invention generally relates to the field of automated image analysis and, in particular, to the presentation of a graphical representation of a handwritten message on a small graphical screen.

PRIOR ART

In applications within the field of automated image analysis it may be desirable to divide images into smaller components with the purpose of analyzing and processing the components individually, for example, if the image is to be shown on a screen which is smaller than the image.

If the image contains information in the form of text, the text can be divided into words and the words can be shown one by one on the screen. The division may be based on the fact that a character at the end of a word is separated from a character at the beginning of the next word with an extra large distance as compared to the distance between characters within a word.

Other examples when such a division is used are all types of automatic recognition of text or portions in images by automatic image processing. In automatic text recognition the text is divided into words which, in their turn, then are divided into characters which are recognized by a arrangement for automatic character recognition.

In the case of handwritten information which may contain text or figures, the information is not always as separated as may be the case of typewritten text. There may be some overlapping, such as a word on a line in the text overlapping a word on a line above or below etc. This results in difficulties in distinguishing the words and the figures by automatic image processing by means of prior-art technique.

An alternative to dividing an image for display on a screen which is smaller than the image is to reduce the image. However, handwritten information is difficult to interpret when reduced.

Patent publication WO 01/71651 discloses a method and arrangement in mobile stations or mobile telephone systems for processing primary information objects, containing a graphical representation of handwritten messages. The methods comprise the following steps: identifying image areas in a primary information object, the size of the image areas being based on the display characteristics of a display on which the message is intended to be shown, and the image areas containing parts of a handwritten message; and creating at least one secondary information object containing at least one of said image areas.

SUMMARY OF THE INVENTION

One object of the invention is to wholly or partly alleviate the above-mentioned problems of prior-art technique and, thus, to facilitate presentation of a graphical representation of a handwritten message on a graphical screen.

Another object of the invention is to take advantage of the dynamics in the generation of a handwritte nmessage for its division in subportions suitable for display on a small screen.

According to a first aspect of the invention, the above-mentioned object is achieved by means of a method for facilitating presentation of a graphical representation of a handwritten message on a graphical screen. According to the method, position data which indicates positions for the handwritten message is recorded and time data which for each position for the handwritten message indicates a point of time for the creation of the handwritten message in this position is recorded. Subsequently, said position data and said time data are used to identify an image area in the graphical representation of the handwritten message, the size of the image area being smaller than the graphical representation of the complete handwritten message. Finally, display data is provided to a screen, which display data comprises a graphical representation of portions of the handwritten message in the identified image area.

In the cases where portions of the handwritten message overlap one another in space, i.e. different portions of the handwritten message have a common position, use of only position data results in problems when identifying an image area which comprises a relevant portion of the handwritten message for, for instance, display on a screen. By the recording of time data, further information apart from position data is obtained, which allows an image area that comprises a relevant portion of the handwritten message or different portions of the handwritten message which have a close relationship, to be identified. This is made by identifying portions, which, apart from a relationship between their position data, also have a relationship between their time data. For example, an image area can be identified, which comprises portions of the handwritten message that have position data within a given range and that at the same time have time data within a given range.

According to a first embodiment of the invention, in which the handwritten message comprises handwritten objects, distances between the handwritten objects in space and in time are determined based on said position data and said time data. An image area which comprises one or more of the handwritten objects is subsequently identified based on the distances in space and in time. Finally, display data is provided which comprises a graphical representation of said image area to a screen.

The handwritten objects constitute units which are relevant for display one by one or several simultaneously depending on the size of the image area to be identified. According to the first embodiment, one or more handwritten objects are isolated and an image area which comprises said one or more handwritten objects is identified. In this respect, use is made of the fact that the handwritten objects are arranged in such a manner that portions within the object normally have considerably smaller distances in space between one another than the distances in space between different handwritten objects. In addition, use is made of the fact that the handwritten objects in the cases when they overlap one another in space have a considerable distance between the points of time at which they are created.

In a case in which the handwritten objects are arranged in succession and essentially parallel to an axis in the graphical representation of the handwritten message, such as a distance along said axis and in time between the handwritten objects is determined in the method according to the first embodiment. These distances are determined based on said position data and said time data. This case may arise when the handwritten objects are words which are arranged in lines. Distances between handwritten objects are in this case most important along a line which corresponds to distances between words on the same line which usually are clearly indicated in handwritten text, Distances between the handwritten objects perpendicular to a line, which corresponds to words which are found on different lines, can sometimes vanish when a word on a line overlaps a word on an adjacent line. Instead of identifying distances between the handwritten objects perpendicular to a line, distances in time between the handwritten objects are identified with the aim of distinguishing words on different lines. Thus, use is made of the fact that words on different lines usually have been created at considerably different points of time. An image area which comprises one or more handwritten objects is subsequently identified on the basis of the determined distances along the line and in time from other handwritten objects.

In accordance with a second embodiment of the method according to the invention, an image area is identified in the graphical representation of the handwritten message which relates to a point of time for the creation of the handwritten message in a position. The image area comprises this position and is smaller than the graphical representation of the handwritten message. Finally, display data which represents the identified image area is provided to a screen.

According to this second embodiment, said recorded time data is used by an image area being identified for a predetermined point of time, the image area comprising a position which is associated with the point of time. Moreover, said display data may contain only that part of the portions of the handwritten message in the identified image area which has been created up to said point of time and fits within the image area. Consequently, an instantaneous image of the handwritten message at this point of time is produced. This display is may be repeated a number of times for different successive points of time which correspond to the creation of different portions of the handwritten message. Thus, a number of image areas can be provided to a screen for display of a series of image areas which together give an animation of the creation of the handwritten message in an image area which is smaller than the handwritten message and which comprises the position in which the handwritten message was created at a current point of time.

The graphical representation of a handwritten message provided in the embodiments mentioned above, for instance, by displacement of an optical sensor relative to a position-coding pattern. In addition, said position data and said time data are subsequently provided by the optical sensor by detection of positions, such as absolute positions, in said pattern and points of time, respectively, being associated with said positions.

In accordance with a second aspect of the invention, a corresponding arrangement for carrying out the method according to the first aspect is provided.

BRIEF DESCRIPTION OF THE DRAWINGS

Further objects, features and advantages of the invention will appear from the following detailed description of the invention with reference to the accompanying drawings, in which.

DETAILED DESCRIPTION OF EMBODIMENTS OF THE INVENTION

Figure 1:
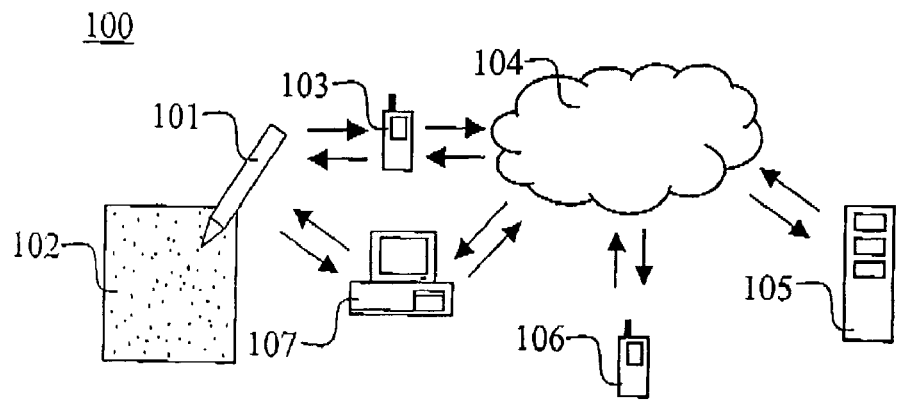
FIG. 1 is a schematic diagram showing a system in which the invention is used.

FIG. 1 schematically discloses a system 100 comprising a handheld drawing device 101 for generating handwritten messages. The drawing device comprises an optical sensor which, when displaced across a surface 102 provided with an absolute position-coding pattern, detects absolute positions on the surface 102. The displacement is recorded as a series of positions, which corresponds to the handwritten message. The drawing device may further comprise a built-in transmitter and may be connected to a mobile telephone 103 via an infrared connection or a short-range RF communication. The mobile telephone is then connected to a mobile telephone network 104, such as a GSM network having GPRS functionality or a 3G network. In addition, the system 100 comprises a server 105 for handling the transmission of handwritten messages. The handwritten message is transmitted from the sending mobile telephone 103 in a file which contains a digital representation of the handwritten message to a receiving mobile telephone 106. It should be noted that the mobile telephone 103 and 106 may be prelace by another electronic equipment, such as a personal computer or a PDA 107.

A method according to the invention may be carried out at many different locations in the system 100 as shown in FIG. 1, such as in the drawing device 101, in the transmitting mobile telephone 103, in the receiving mobile telephone 106, in the transmitting personal computer 107 or in the server 105 which is connected to the system 100.

Figure 2A:
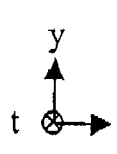
FIGS. 2A–D are schematic diagrams showing a handwritten message and different steps in a first embodiment of a method according to the invention.
Figure 2B:
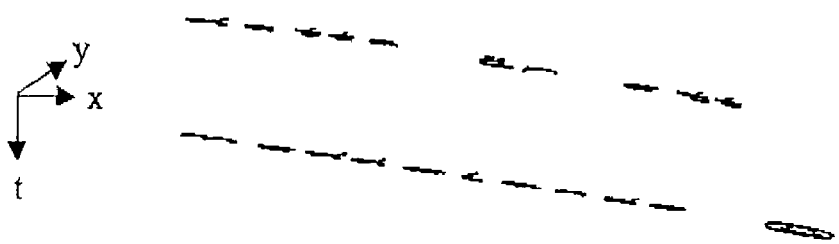
Figure 2C:
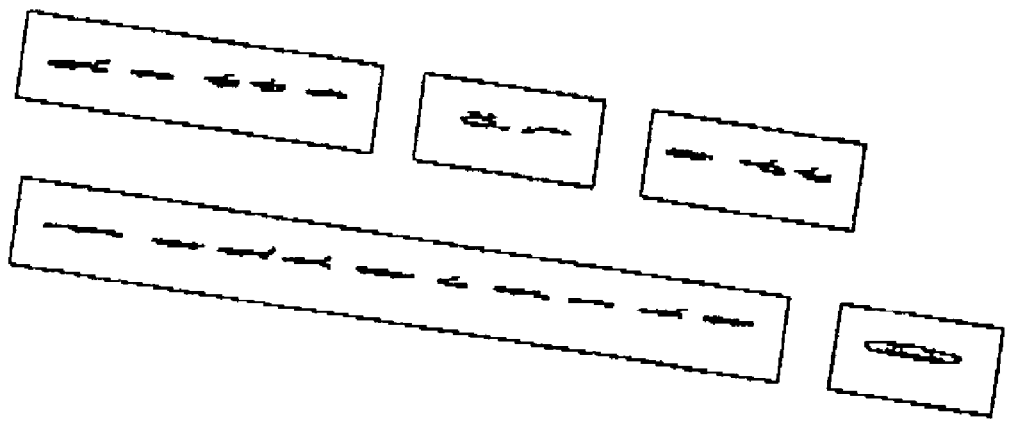
Figure 2D:
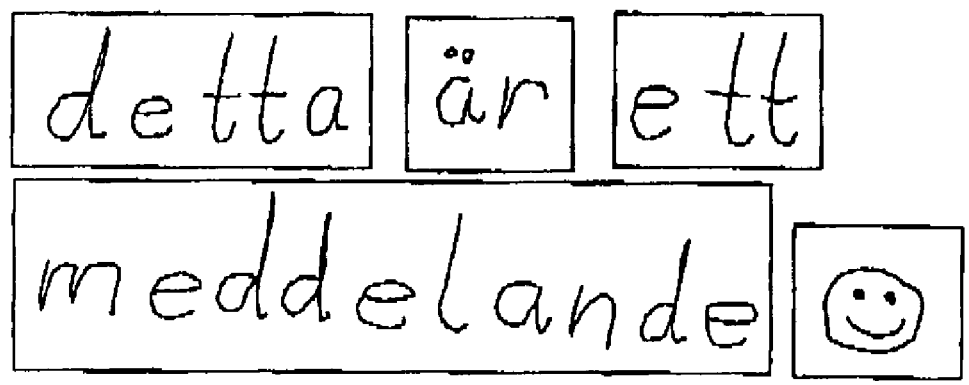

A first embodiment of a method according to the invention will now be described with reference to FIGS. 2A–D. FIG. 2A shows a graphical representation of a handwritten message. FIGS. 2B–D show different steps in the first embodiment.

The message which is shown in FIG. 2A says "detta är ett meddelande ☺" ("this is a message ☺"). The graphical representation may be stored in a file in vector format. The graphical representation was created by the optical sensor moveing across the surface 102. Moreover, the optical sensor is adapted to detect positions on the surface by means of the position-coding pattern. The displacement of the optical sensor in relation to the surface is recorded as a series of positions which corresponds to the displacement. Furthermore, also the point of time is recorded when the optical sensor is moved across the respective positions on the surface. The drawing device forwards position data and time data to a computer system, for example, in a mobile unit or a personal computer. The drawing device may also comprise a drawing pen, whereby the displacement also results in a trace on the surface in the form of a visible line. The computer system may be arranged in the handheld, mobile, pen-shaped unit which comprises the optical sensor, and furthermore a processor, a memory and a communication device, such as a short-range radio link or an infrared link (IR link).

Patent publications WO 00/73983 and WO 01/26032 disclose a position-coding pattern, and the contents of these publications is incorporated herein by reference. A note pad in which a message such as that described above can be generated is disclosed in patent publication WO 01/16691, the contents of which is incorporated herein by reference.

There are other methods of generating handwritten messages comprising position-data and time data, such as acceleration sensors, touch screens, triangulation of signals, interference analysis, etc.

Said position data and time data for the handwritten message are transmitted to the mobile telephone 103 via the communication device and then further to the server 105 which is connected to the system (see FIG. 1), in which server image areas are identified, see below.

FIG. 2A shows that the handwritten message has been written in such a manner that one of the letters in a word on a line overlaps a letter in a word on another line. In particular, the first letter "d" in the word "meddelande" ("message") on the lower line overlaps the second letter "t" in the word "detta" ("this") on the upper line. When dividing the message into smaller parts, such as dividing it into words for display one by one on a screen that is smaller than the size of the handwritten message, it is thus not sufficient to identify distances which are larger than the normal distance between letters and lines within a word. This would result in the words "detta" (this) and "meddelande" (message) being perceived as one unit.

According to the invention, instead use is made of the tact that also the points of time at which different positions of the handwritten message were created have been recorded. This involves that the shown handwritten message is given a three-dimensional representation where two dimensions correspond to the extension of the handwritten message relative to the surface having the position-coding pattern along two perpendicular axis x and y, where the x axis is approximately parallel to the lines, and a third dimension corresponds to the extension of the handwritten message in time along a t axis which is perpendicular to the other two axes.

FIG. 2B shows the handwritten message in another perspective, where the message has been rotated so that it is almost seen along the y axis. In this perspective, it can be seen that the words, despite overlapping along the y axis, are distinctly separated along both the x axis and the t axis, which allows the words to be separated, as shown in FIG. 2C. Given this, image areas which comprises a single word or symbol can be identified, as shown in FIG. 2D. The separation of the words is made, for instance, by means of a frequency analysis of distances between portions of the handwritten message along a space diagonal along the x-t axis. Distances that correspond to spaces between words will be distinctly separated from distances which correspond to spaces between letters. Subsequently, display data as regards the identified image areas can be provided, for example, to a mobile telephone to be shown one by one on a screen.

In order to handle handdrawn figures exceeding one or more lines in the handwritten message the figures may be required to be identified and excluded from the above described segmentation method. Different methods could be used to identify the figures. A method may require the user to draw a closed curve round the figure. The curve is easily identified and the figure could be excluded from the segmentation method and handled as separate display data.

The identification of image areas may be made by said position data and said time data being analyzed by means of a processor which is located in said drawing device, said mobile telephone or said server.

The transmission of said display data is made with the aid of suitable transmission means which vary depending on where the screen on which the image area is to be displayed is located. In the case where the screen is arranged on a mobile telephone, said display data is transmitted via a radio transmitter or an infrared transmitter.

Figure 3A:
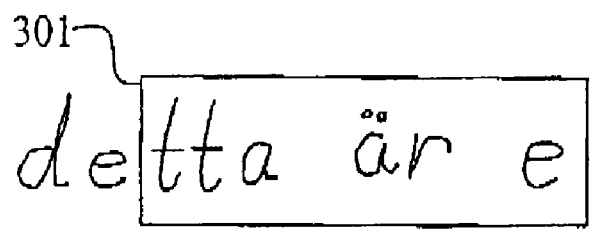
FIGS. 3A–C are schematic diagrams showing a handwritten message and different steps in a second embodiment of a method according to the invention.
Figure 3B:
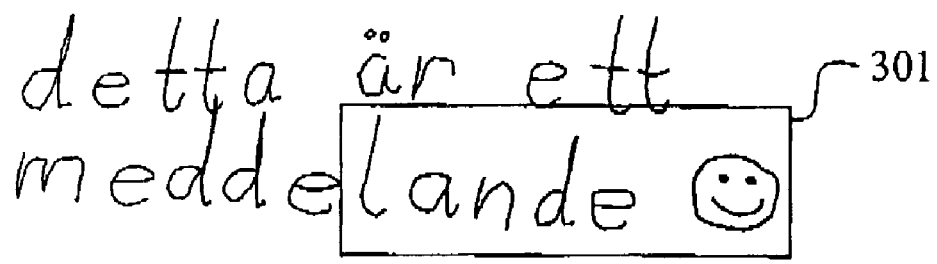
Figure 3C:
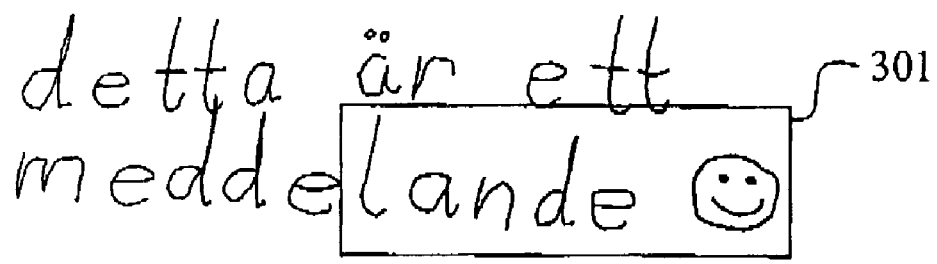

A second embodiment of a method according to the invention will now be described with reference to FIGS. 3A–C. FIG. 3A shows a graphical representation of the handwritten message according to FIG. 2A. FIGS. 3B–C show different steps in the second embodiment.

Also in this case the message which is shown in FIG. 3A says "detta är ett meddelande ☺" ("this is a message ☺". Position data and time data as regards the handwritten message are recorded in the same way as described above. In the receiving mobile telephone, image areas are then identified as follows.

By means of the position data and time data supplied, the receiving mobile telephone creates an animation of the handwritten message on its screen by drawing, in turns, for points of time, one by one, of the series of points of time, the handwritten message in the position that corresponds to each point of time.

For each point of time for the creation of the handwritten message in a position, an image area is identified in the graphical representation of the handwritten message. The image area comprises the position and its size may be adapted to the screen on which it is to be displayed. The display data which is provided to the screen contains only the portions of the handwritten message in the identified image area which have been created up to the point of time in question.

At each point of time of the handwritten image, a portion of the message that fits in the window of the screen is displayed, and the point of time is moved on at a pace that permits the message to be read. The pace of time may be equal to the speed of writing the handwritten message or slower or faster as controlled by the receiving mobile telephone operator.

If a figure or symbol is to be displayed, which is larger than the display, the display program will recognize this fact and adapt the figure or symbol so that it may be displaced, for example by reducing the size of the figure or symbol.

Sometimes it may be difficult to separate two words because the handwritten traces cross each other. In this case, the words may be separated because of the fact that the pen is normally lifted between the words and a longer time interval is present between the words. In the case of cursive writing, a single word is drawn in a single movement followed by a lift of the pen. If separate letters are printed by the pen, there is often a longer time space when the word is ended.

FIG. 3B shows a portion of the handwritten message which has been created before a first point of time, for example 3 seconds after the start of the message. In addition, a window 301 is shown, which frames an image area, which corresponds to the size of the display of the reveiving mobile telephone and that is to be shown for this first point of time. The image area comprises the position which is associated with the first point of time and a part of the portion of the handwritten message that has been created before this point of time. The window 301 is then moved as regards the different points of time which have been recorded for the handwritten message and follows the position which is associated with the point of time in question. FIG. 3C shows the position of this window 301 at a second point of time.

Software, which carries out the method described above, is written in accordance with the description, and it is presumed that those skilled in the art will select suitable tools in order to perform such programming, The software can occur or be stored in all known manners within the field, such as volatile or non-volatile memories which can be connected to the processor and be read by the processor, for example, a diskette or a CD-ROM, and also as propagating signals, such as the bit stream which is found in Internet transmission of packets or carrier signals which are transmitted to satellites.

The invention has been described hereinabove with reference to embodiments of the invention. It is remarked that the invention is not limited to the disclosed embodiments. The different features of the embodiments may be combined in different manners within the scope of the invention, The invention is only limited by the apended patent claims.

What we claim and desire to secure by Letters Patent is:

1. A method for presentation of a graphical representation of a handwritten message on a screen, comprising:
   receiving position data which indicates positions for the handwritten message wherein the position data graphically represents the handwritten message,
   receiving time data, which for each position of the handwritten message indicates a point of time for the creation of the handwritten message in this position,
   identifying a plurality of image areas in the graphical representation of the handwritten message based on said position data and said time data, the size of each image area being smaller than the graphical representation of the complete handwritten message,
   determining an ordering of said plurality of image areas based on said time data, and
   providing display data to said screen, wherein said display data comprises a sequence of the plurality of image areas to be displayed on said screen according to said ordering,
   wherein the handwritten message is a hard copy representation created on a position-coding pattern.

2. A method as claimed in claim 1, wherein the handwritten message comprises handwritten objects, the method further comprising:
   determining distances between the handwritten objects in space and in time based on said position data and said time data;
   wherein said identifying said plurality of image areas comprises identifying one or more of the handwritten objects based on the distances in space and in time.

3. A method as claimed in claim 2, wherein said handwritten objects are arranged substantially along an axis in the graphical representation of the handwritten message, said method further comprising,
   determining distances along said axis based on said position data and said time data; and
   identifying an image area which comprises one more of said handwritten objects based on the determined distances along said axis and in time from the other handwritten objects in the identifying step.

4. A method as claimed in claim 3, wherein said handwritten objects are handwritten words which are arranged in lines and said distances along said axis are spaces between successive words in a line.

5. A method as claimed in claim 1, wherein said graphical representation of a handwritten message is provided by displacement of an optical sensor in relation to a position-coding pattern, and wherein said position data and said time data are provided by the optical sensor by detecting positions in said pattern and points of time, associated with said positions.

6. A computer-readable medium which has executable instructions for carrying out the steps in claim 1.

7. The method of claim 1, wherein said plurality of image areas are mutually non-overlapping in the graphical representation of the handwritten message.

8. The method of claim 1, further comprising:
   searching said handwritten message for handdrawn pictures, and
   excluding said handdrawn pictures from said handwritten message in said identifying of image areas.

9. The method of claim 8, wherein said searching comprises searching said handwritten message for predetermined gestures.

10. The method of claim 8, wherein said searching comprises identifying an encircling object in said handwritten message.

11. The method of claim 8, further comprising:
    providing each handdrawn picture as an ordered image area in said display data.

12. The method of claim 1, wherein the ordering facilitates display on a screen whose size is smaller than the handwritten message.

13. A method for presentation of a graphical representation of a handwritten message on a screen, comprising
    receiving position data which indicates positions for the handwritten message wherein the position data graphically represents the handwritten message,
    receiving time data, which for each position of the handwritten message indicates a point of time for the creation of the handwritten message in this position,
    identifying a selected point of time,
    identifying an image area around a position that corresponds to the selected point of time, the size of the image area being smaller than the graphical representation of the complete handwritten message, and
    providing display data to said screen, which display data comprises a graphical representation of that part of the handwritten message which has been created up to said point of time and which fits within said image area,
    wherein the handwritten message is a hard copy representation created on a position-coding pattern.

14. The method of claim 13, further comprising:
    repeatedly effecting said steps of identifying and providing for successive points of time, to thereby generate an animation on said screen of the creation of the handwritten message.

15. A method as claimed in claim 13, wherein said graphical representation of a handwritten message is provided by displacement of an optical sensor in relation to a position-coding pattern, and wherein said position data and said time data are provided by the optical sensor by detecting positions in said pattern and points of time, associated with said positions.

16. An apparatus for presentation of a graphical representation of a handwritten message on a graphical screen, comprising a memory storing a set of instructions; and a processor configured to execute the set of instructions stored in memory to perform a method for presenting the graphical representation, the method comprising:
    receiving position data which indicates positions of the handwritten message and time data which for each position of the handwritten message indicates a point of time for the creation of the handwritten message in this position, wherein the handwritten message is a hard copy representation created on a position-coding pattern, and wherein the position data graphically represents the handwritten message,
    identifying a plurality of image areas in the graphical representation of the handwritten message based on said position data and said time data, the size of each of the plurality of image areas being smaller than the graphical representation of the complete handwritten message, determining an ordering of said plurality of image areas based on said time data, and providing display data to said screen, which display data comprises a sequence of the plurality of image areas to be displayed on the screen according to the determined ordering.

17. An apparatus as claimed in claim 16, wherein the handwritten message comprises handwritten objects, said processor further configured to determine distances between the handwritten objects in space and time based on said position data and said time data, and to identify said plurality of image areas which comprises one or more of the handwritten objects based on the distance in space and time between these and other handwritten objects.

18. An apparatus as claimed in claim 17, wherein the handwritten objects are arranged substantially along an axis in the graphical representation of the handwritten message, and said processor further configured to determine a distance along said axis and in time between the handwritten objects based on said position data and said time data, and to identify an image area which comprises one or more handwritten objects based on the determined distance along said axis and in time from the other handwritten objects.

19. An apparatus as claimed in claim 18, wherein said handwritten objects are handwritten words which are arranged in lines and said distances along said axis are spaces between successive words in a line.

20. An apparatus as claimed in claim 16, further comprising an optical sensor for providing said graphical representation of a handwritten message by displacement relative to a position-coding pattern, and for providing said position data and said time data by detecting positions in said pattern and points of time, associated with said positions.

21. An apparatus for presentation of a graphical representation of a hand written message on a screen, comprising a memory storing a set of instructions; and a processor configured to execute the set of instructions stored in memory to perform a method for presenting the graphical representation, the method comprising:

receiving position data which indicates positions of the handwritten message and time data which for each position of the handwritten message indicates a point of time for the creation of the handwritten message in this position, wherein the handwritten message is a hard copy representation created on a position-coding pattern, and wherein the position data graphically represents the handwritten message, identifying a selected point of time and identifying an image area around a position that corresponds to the selected point of time, the size of the image area being smaller than the graphical representation of the complete handwritten message, and providing display data to said screen, which display data comprises a graphical representation of that part of the handwritten message which has been created up to said point of time and which fits within said image area.

* * * * *